United States Patent
Schweikert et al.

(10) Patent No.: US 9,989,947 B2
(45) Date of Patent: Jun. 5, 2018

(54) DRIVER CIRCUIT FOR DRIVING ELECTROMAGNETIC ACTUATORS

(71) Applicant: Infineon Technologies AG, Neubiberg (DE)

(72) Inventors: Christian Schweikert, Munich (DE); Juergen Schaefer, Gruenwald (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 494 days.

(21) Appl. No.: 13/971,039

(22) Filed: Aug. 20, 2013

(65) Prior Publication Data

US 2015/0057806 A1   Feb. 26, 2015

(51) Int. Cl.
- *G05B 19/04* (2006.01)
- *F02D 41/20* (2006.01)
- *F02D 41/28* (2006.01)

(52) U.S. Cl.
CPC ............ *G05B 19/04* (2013.01); *F02D 41/20* (2013.01); *F02D 41/28* (2013.01); *F02D 2250/12* (2013.01)

(58) Field of Classification Search
CPC ......... G05B 19/04; F02D 41/28; F02D 41/20; F02C 2250/12
See application file for complete search history.

(56) References Cited

U.S. PATENT DOCUMENTS 3,914,580 A * 10/1975 Watson ................. F02D 41/009
                                                 123/486

4,408,584 A   10/1983 Yabuhara et al.
(Continued)

FOREIGN PATENT DOCUMENTS

CN   1317501 C   5/2007
DE   3128193 A1  3/1982
(Continued)

OTHER PUBLICATIONS

Analog Integrated Circuit Device Data, Freescale Semiconductor Advance Information, "Automotive Engine Control IC," www.freescale.com, Doc. No. MC33810, Rev. 6.0, Dec. 2008, 35 pages.
(Continued)

*Primary Examiner* — Kenneth M Lo
*Assistant Examiner* — David J Wynne
(74) *Attorney, Agent, or Firm* — Slater Matsil, LLP

(57) ABSTRACT

Techniques for driving a plurality of inductive actuators are described herein. According to these techniques, a driver unit includes a clock terminal that receives an external clock signal used by an external control unit. The driver unit further includes a serial bus interface configured to communicate with the external control unit via a serial bus. The serial bus is configured to communicate both of trigger commands synchronized to the external clock signal that indicate to at least one of a plurality of programmable control circuits (PCUs) to generate drive signals in response to the trigger commands that are synchronized with the external clock signal and data associated with at least one of the plurality of PCUs and synchronized with the external clock signal, wherein the data is used by the at least one of the plurality of PCUs to generate the drive signals in response to the trigger commands.

23 Claims, 3 Drawing Sheets

(56) References Cited

U.S. PATENT DOCUMENTS

| | | | | |
|---|---|---|---|---|
| 5,178,115 | A * | 1/1993 | Daly | F02D 41/3005<br>123/456 |
| 6,360,725 | B1 * | 3/2002 | Scherrbacher | F02D 41/20<br>123/490 |
| 7,280,339 | B2 * | 10/2007 | Manzone | F02D 41/266<br>123/490 |
| 2004/0230347 | A1 * | 11/2004 | Sakurai | F02D 37/02<br>701/1 |
| 2008/0109151 | A1 * | 5/2008 | Jaros | F01L 9/02<br>701/115 |
| 2008/0172506 | A1 * | 7/2008 | Ellerbrock | H04L 12/40032<br>710/104 |
| 2009/0190283 | A1 * | 7/2009 | Hammerschmidt | G01D 5/24466<br>361/240 |
| 2010/0169696 | A1 * | 7/2010 | D'Angelo | B60W 50/0098<br>713/401 |
| 2010/0274416 | A1 * | 10/2010 | Poisson | B64D 31/14<br>701/3 |
| 2014/0150751 | A1 * | 6/2014 | Cheever, Jr. | F02D 41/20<br>123/480 |

FOREIGN PATENT DOCUMENTS

| | | |
|---|---|---|
| JP | 5013723 A | 2/1975 |
| WO | 9949195 A1 | 9/1999 |

OTHER PUBLICATIONS

"Flex MultiChannel Low-Side Switches, Solutions for Powertrain, Safety and Industrial Applications," www.infineon.com/flex, Order No. B000-H0000-X-X-7600, Sep. 2010; 16 pages.

"TLE 8718 SA Smart 18-Channel Lowside Switch with Micro Second Bus," www.infineon.com, Data Sheet, Rev. 1.1, Jul. 31, 2012, 82 pages.

* cited by examiner

DRIVER CIRCUIT FOR DRIVING ELECTROMAGNETIC ACTUATORS

TECHNICAL FIELD

The present invention relates to the field of driver circuits for driving electromagnetic actuators, particularly for driving electromagnetic valves (solenoid valves).

BACKGROUND

One important application for electromagnetic actuators is fuel injection systems for internal combustion engines in which the solenoid valves are as used solenoid fuel injectors. Generally, a combustion engine having an electronic fuel injection system includes an engine control unit (ECU) which makes use of a dedicated micro controller to determine the exact time instant of the fuel injection and the quantity of the delivered fuel. A micro controller, however, does not directly supply the solenoid fuel injectors with the required current, but rather sends commands to a separate driver unit which is configured to generate the required driver signals for power stages (e.g., MOSFETs) that actuate the solenoid fuel injectors. The driver unit may be configured to obtain (e.g., measure) feedback signals present in the solenoid or in the power stage. One such feedback signal is, for example, the actual current passing through the solenoid during operation of the injector. Other feedback signals may be internal signals of the power stage (e.g., the drain-source voltage of a MOSFET) or of the driver unit. As the timing requirements for the fuel injection are relatively tight in modern injections systems the communication between the micro controller and the driver unit has to comply with strict real-time constraints.

SUMMARY OF THE DISCLOSURE

According to one example, a driver unit for driving a plurality of inductive actuators is described herein. The driver unit includes a clock terminal configured to receive an external clock signal used by an external control unit that is external to the driver unit. A serial bus interface is configured to communicate with the external control unit via a serial bus. The serial bus interface is configured to communicate trigger commands which are synchronized to the external clock signal. The trigger commands indicate to at least one of a plurality of programmable control circuits (PCUs) to generate drive signals for the plurality of inductive actuators in response to the trigger commands that are synchronized with the external clock signal. The serial bus interface is configured to also communicate data associated with at least one of the plurality of PCUs and synchronized with the external clock signal. The data is used by the at least one of the plurality of PCUs to generate the drive signals in response to the trigger commands.

According to a second example, a method for driving a plurality of inductive actuators is described. The method includes receiving an external clock signal used by an external controller unit. Trigger commands are received from the external control unit at a plurality of programmable control circuits (PCUs) in synchronization with the external clock signal. The plurality of PCUs are each associated with one of the plurality of inductive actuators. Drive signals for the plurality of inductive actuators are generated in response to the received trigger commands and using the plurality of PCUs, wherein the drive signals are synchronized with the external clock signal. Data associated with at least one of the plurality of PCUs and synchronized with the external clock signal is received. The data is used by the at least one of the plurality of PCUs to generate the drive signals in response to the trigger commands.

According to a third example, an engine control unit is described herein. The engine control unit includes a micro controller unit (MCU) and a driver unit configured to drive a plurality of inductive actuators. The driver unit includes a clock terminal configured to receive an external clock signal used by an external control unit that is external to the driver unit. A serial bus interface is configured to communicate with the external control unit via a serial bus. The serial bus interface is configured to communicate trigger commands which are synchronized to the external clock signal. The trigger commands indicate to at least one of a plurality of programmable control circuits (PCUs) to generate drive signals for the plurality of inductive actuators in response to the trigger commands that are synchronized with the external clock signal. The serial bus interface is configured to also communicate data associated with at least one of the plurality of PCUs and synchronized with the external clock signal. The data is used by the at least one of the plurality of PCUs to generate the drive signals in response to the trigger commands.

BRIEF DESCRIPTION OF THE DRAWINGS

The various embodiments can be better understood with reference to the following drawings and descriptions. The components in the figures are not necessarily to scale, instead emphasis is placed upon illustrating the principles of the invention. Moreover, in the figures, like reference numerals designate corresponding parts. In the drawings.

DETAILED DESCRIPTION OF ILLUSTRATIVE EMBODIMENTS

The description below is generally related to a fuel injection system to be used with internal combustion engines. Such fuel injection systems include a plurality of solenoid injectors. The description below is particularly related to a driver unit for controlling the operation of the solenoid injectors. Such driver units, however, can also be applied to other inductive actuators (such as, e.g., hydraulic valves) and not only to solenoid injectors for combustion engines. Thus, the present description should not be regarded as limiting to driver units for solenoid fuel injectors.

According to one or more aspects of this disclosure a driver unit that drives a plurality of inductive actuators is configured to communicate with an external controller in synchronization with a clock signal used by or generated by the external controller. The external controller may comprise a microcontroller unit (MCU) as well as an oscillator which may be integrated in or connected to the MCU. According to the synchronization techniques described herein, functionality of the driver unit may be improved and/or implementation of the driver unit and the external controller may be simplified. For example, using these techniques may allow for a real-time serial exchange of both trigger commands and data associated with execution of the trigger commands between the external controller and the driver unit without the need for an analog and/or parallel communication interface between the external controller and the driver unit. As still another example, these techniques may enable implementation of the driver unit and/or the external controller to be simpler, more reliable, and less expensive than other implementations.

Figure 1:
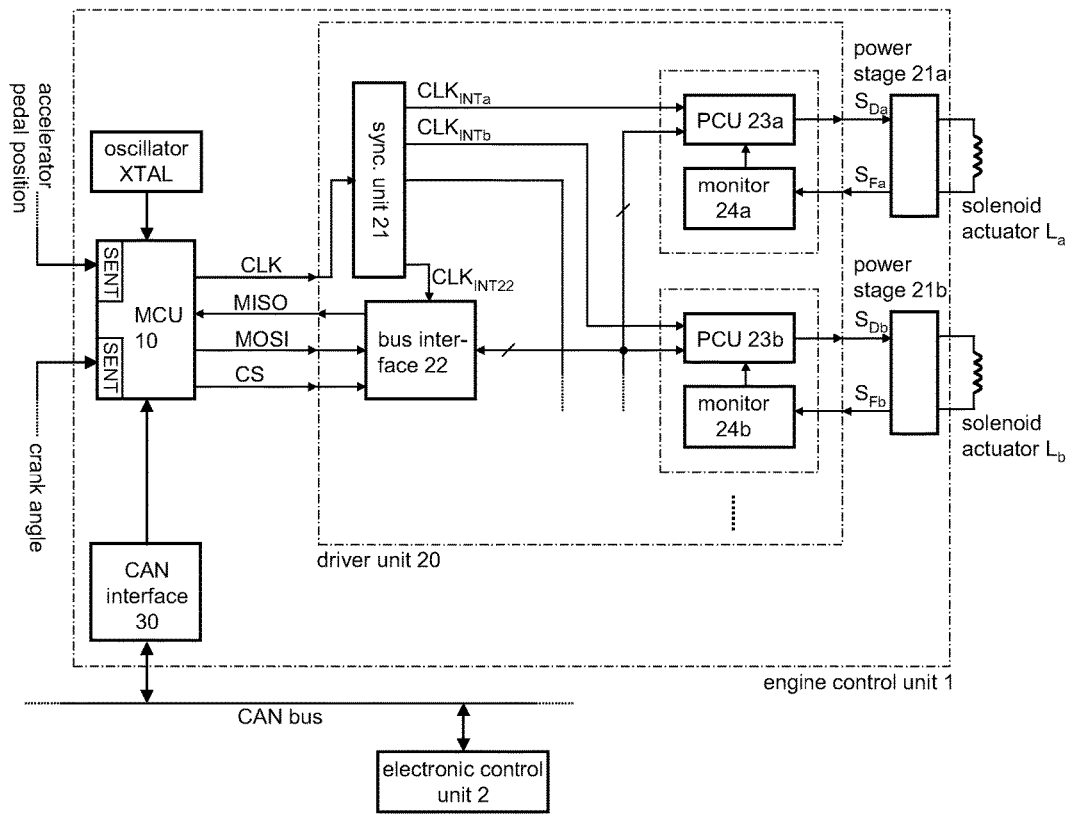
FIG. 1 illustrates one example of an engine control unit including a micro controller unit coupled to a driver unit for driving solenoid fuel injectors according to one or more aspects of this disclosure.

FIG. 1 illustrates some important components of a system for controlling the operation of inductive actuators, in particular a system for controlling the operation of a plurality of solenoid valves as used in fuel injectors. The operation of the solenoid valves (labeled $L_a$, and $L_b$ in FIG. 1) is controlled by a controller unit, which may be referred to as micro controller unit 10 (MCU) in the context of a fuel injection system. The operation of the solenoid valves $L_a$ and $L_b$ is controlled by a driver unit 20 which is configured to generate drive signals $S_{Sa}$, $S_{Db}$ to be supplied to the solenoid valves $L_a$, $L_b$ directly or indirectly via a power stage that may include one or more power transistors (e.g., MOSFETs). The driver unit 20 may be configured to monitor (i.e., acquire and process) signals (e.g., which indicate a measurement of a current through solenoid valves) that represent a physical state of the actuators (i.e., the solenoid valves) or a state of the respective power stages and to feed information concerning the physical state of the actuators and the power stages back to the MCU 10. Additionally or alternatively this information may be used within the driver unit 20, e.g., for regulating the solenoid current.

Both the MCU 10 and the driver unit 20 may be part of an engine control unit 1 (ECU) which generally controls the operation of a combustion engine. The MCU 10 and the driver unit 20 may each be integrated in separate chip and/or packages and mounted on one printed circuit board (PCB), or may be integrated in the same semiconductor package. The ECU 1 may further include a bus interface 30 (e.g., a controller area network (CAN) interface, a so-called "single ended nibble transmission" (SENT) interface, or any other communications interface) for communicating with other electronic control units 2, which may provide one or more signals that indicate a state of one or more components of an automobile (e.g., accelerator pedal position, crank angle, etc.). In some examples, the bus interface 30 may be integrated together with the MCU 10 in an integrated circuit and/or be housed within the same package as MCU 10. In other examples, the bus interface 2 may be mounted in a separate chip package on the same printed circuit board (PCB) as the MCU 10 and the driver circuit 20, wherein the PCB forms part of the mentioned ECU 1.

The MCU 10 and the driver unit 20 are coupled via a serial bus that allows, e.g., a bidirectional communication between the MCU 10 and the driver unit 20. Additionally, the MCU 10 may (digitally) receive further input information, such as (in the context of an internal combustion engine), the crank angle, the accelerator pedal position, and various other information, which is provided by external components, e.g., via a CAN or SENT interface, which allows asynchronous, unidirectional data transmission. However, instead of using CAN or SENT the external information may also be supplied to the MCU 10 via other signal paths.

In accordance with the present example of the invention the MCU is coupled with an oscillator XTAL (e.g., a crystal oscillator) which generates a clock signal CLK. The oscillator may be, however, integrated in the MCU 10. The signal processing performed in the MCU 10 or in the driver unit 20, e.g., the processing of the above-mentioned input information may be executed synchronously to the clock signal CLK. Analogously, the serial data transfer between the MCU 10 and the driver unit 20 is implemented as a clocked data transfer that is synchronous to the clock signal CLK. Thus, the oscillator XTAL may be regarded as part of the interface of the MCU 10 which enables the serial communication between the MCU 10 and the driver unit 20. In the present example, the MCU 10 operates as bus master which controls the communication, and the MCU 10 transmits data to the driver unit 20 across a first bus line denoted as MOSI (short for master out/slave in) and receives data from the driver unit 20 via a second bus line denoted as MISO (short for master in/slave out). The optional chip select signal CS is needed if more than one bus slave is connected to the serial bus. The CS signal allows the MCU to address the bus interface. For example, the MCU can address the bus interface of the driver unit 20 (which acts as bus slave in the present example). The ability of the driver unit 20 to send feedback information concerning the operation of the solenoids $L_a$, $L_b$ and/or the driver unit 20 back to the MCU 10 enables the MCU 10 to implement a control loop. In some examples, a bi-directional synchronous serial data transfer between the MCU 10 and the driver unit 20 may be used for the feedback of information from the driver unit 20 to the MCU 10.

In accordance with the present example, the driver unit 20 includes a synchronization circuit 21, which is supplied with the clock signal CLK generated by the MCU 10 or used by the MCU 10 if an external oscillator XTAL is used. Therefore, the synchronization circuit 21 is connected with an external terminal of the driver unit 20 which is connected, via a clock line, with the oscillator XTAL or with the MCU 10 to receive the clock signal from the MCU 10. In accordance with one exemplary implementation, the synchronization circuit 21 may include a phase locked loop (PLL) to generate at least one internal clock signal $CLK_{INT}$ that is synchronous to (i.e., in phase with) the external clock signal CLK provided by the oscillator XTAL or the MCU 10 and that may serve as a time base for synchronizing the operation of the driver unit 20 to the internal clock signal $CLK_{INT}$ and thus (indirectly) with the clock signal provided by the MCU 10 or the oscillator XTAL (i.e., by the external controller).

The driver circuit 20 includes a serial bus interface 22 which is coupled to the MCU 10 via the serial bus lines MISO and MOSI as mentioned above. It should be noted that the serial communication is based on the transfer of binary information and the data transfer is clocked and thus synchronous to the internal clock signal $CLK_{INT}$ or the external clock signal CLK provided by the external controller, i.e., the MCU 10 (which acts as bus master) or the oscillator XTAL. In contrast to other common serial bus interfaces (e.g., the common serial peripheral interface SPI), the subsequent processing of both trigger commands and data received by the driver unit 20 from the MCU 10 is also synchronous to the clock signal CLK provided by the MCU 10. In some embodiments the serial bus lines MOSI, MISO and the clock line CLK may each include a pair of conductors to allow transmission of differential signals. As one non-limiting example, the serial bus lines MOSI, MISO and the clock line CLK may operate using low-voltage differential signaling (LVDS).

For each one of the plurality of solenoid actuators $L_a$, $L_b$ driver unit 20 includes a corresponding control circuit. In the context of the present example of FIG. 1, these control circuits 23 are further referred to as "programmable control units" (PCU), and each one of the PCUs 23a, 23b (generally the PCUs 23) is associated with one or more corresponding solenoid actuators $L_a$, $L_b$. The PCUs 23 are connected to the serial bus interface 22 to receive data from the MCU 10 via the bus line(s). Each PCU 23 is configured (i.e., programmed) to also receive trigger commands from the MCU 10 via the bus line(s) and, furthermore, to generate drive signals $S_{Da}$, $S_{Db}$ for the respective inductive actuator(s) $L_a$, $L_b$. Moreover, the PCUs 23 are coupled with the synchronization circuit 21 and thus operate synchronously with the internal time base, i.e., with the internal clock signal $CLK_{INT}$. As a consequence, each PCU 23 may operate synchronously with the clock signal provided to the driver unit 20 from the MCU 10 or an external oscillator XTAL, which also clocks the MCU 10. Due to this synchronization, the reception of the trigger commands and data, as well as the generation of the drive signals $S_{Da}$, $S_{Db}$ are synchronous to the internal clock signal (and, consequently, also to the clock signal generated by the oscillator XTAL coupled to the MCU 10). The PCUs 23 may include memory for storing digital drive signal templates (e.g., load current templates) which correspond to or represent a specific (e.g., desired) solenoid current profile. Such a digital drive signal template may indicate, for each solenoid, how the solenoid should operate in response to trigger signals received by the PCUs 23. Each of the PCUs 23 may store the same or similar digital drive signal template(s) as other of the PCUs 23, or may store different digital drive signal template(s) as other of the PCUs 23. In some examples, the memory of each PCU may include program code that controls the operation of the PCU. In such a manner, the PCU may implement a state machine. When receiving a trigger signal, a PCU 23a, 23b may generate a drive signal based on the stored signal template in order to generate a corresponding solenoid current in accordance with the mentioned current profile. The signal templates may be loaded into the PCUs 23 by the MCU 10 during initialization of the driver unit 20 and then, during operation, be adapted by the respective PCU. This adaptation may be done dependent on external commands received from the MCU and/or dependent on feedback signals received by the PCU from the monitor circuit(s) 24 which are discussed below.

In accordance with the present example, the driver unit 20 may include monitor circuits 24a, 24b (generally monitor circuits 24). One monitor circuit 24a, 24b may be provided for or associated with each solenoid actuator $L_a$, $L_b$. That is, each actuator is associated with a PCU (which generates the drive signals for the actuator) and a monitor circuit (which provides the feedback signals from the actuator). Each monitor circuit 24a, 24b is configured to monitor one or more physical parameters of the associated solenoid actuator (i.e., to measure the one or more physical parameters such as the solenoid current) and to provide respective feedback signals $S_{Fa}$, $S_{Fb}$, which represent the measured parameter(s). The feedback signals $S_{Fa}$, $S_{Fb}$ may be received by the corresponding PCU 23a, 23b.

In accordance with one example of the present disclosure, the information (i.e., the feedback signals $S_{Fa}$, $S_{Fb}$) obtained by the monitor circuits 24 may be fed back to the corresponding PCUs 23, and this information may be used for generating the respective drive signals $S_{Da}$, $S_{Db}$. For each solenoid actuator L a desired load current template may be loaded into the respective PCU 23. When receiving a trigger command (via the bus interface 22) from the MCU 10 to actuate a specific solenoid actuator, the respective PCU 23 generates drive signals $S_D$ (see signals $S_{Da}$, $S_{Db}$ in FIG. 1, signals $S_{DH}$, $S_{DL}$ in FIG. 2) which are supplied to the power stages 21 coupled to the respective solenoid actuators thereby using the stored current profile as reference current signal. The actual solenoid current may be monitored (monitor circuit 24) and compared with the reference current signal (e.g., by the PCU 23) which allows for the adjustment of the drive signal(s) $S_D$ such that the actual solenoid current matches the stored desired current profile. Monitoring the actual solenoid current and (optionally) also the voltage drop across the solenoid or across the power transistors (i.e., the drain-source voltage, see also FIG. 2) in the corresponding power stage enables a detection of the time instants at which the solenoid fuel injector actually opens and closes. These time instants may represent a significant (a-priory unknown) delay time following the respective trigger commands received by the PCUs 23.

In accordance with another example of the present disclosure data obtained using the monitor circuits 24a, 24b may be transmitted back to the MCU 10. The information transmitted from the driver unit 20 (particularly from the PCUs 23) to the MCU 10 may include, for example: the observed time instants at which a specific solenoid actuator opens or closes, the delay times between a trigger command and the corresponding reaction of the solenoid actuator, a digital representation of a current level measured in the solenoid, a digital representation of a voltage level measured at the transistors of the power stage coupled to a specific solenoid actuator, or other directly or indirectly measured values. This is, however, not to be regarded as a complete list. Furthermore, signals may be transmitted back to the MCU 10 dependent on the actual implementation and the requirements of the application. These signals are synchronized with the internal clock signal as explained in further detail below.

It is important to emphasize that the PCUs 23 as well as the serial communication between the MCU 10 and the driver unit 20 operate synchronously to the internal clock signal $CLK_{INT}$ and thus also synchronous to the clock CLK supplied to the driver unit 20 by the MCU 10 or the oscillator XTAL.

Figure 2:
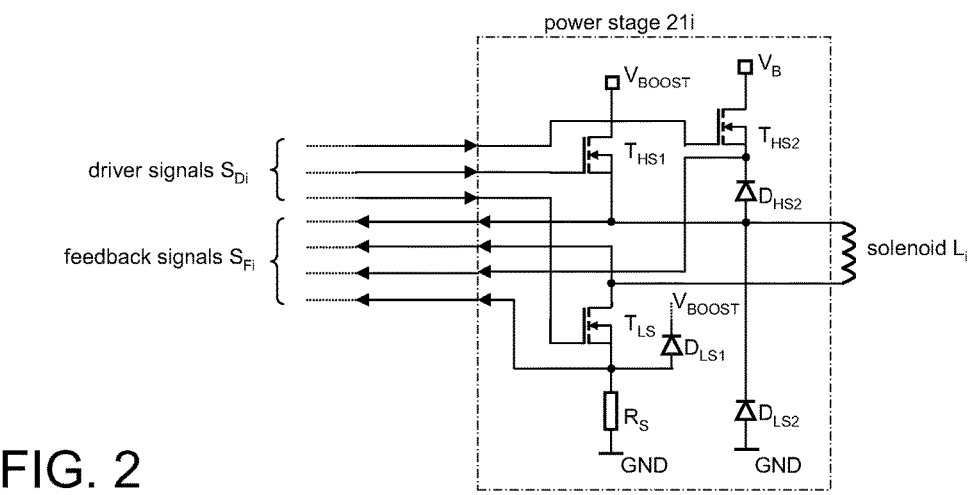
FIG. 2 illustrates one example of a power stage for driving a solenoid valve; and consistent with one or more aspects of this disclosure.

FIG. 2 illustrates one exemplary power stage 21i coupled to a solenoid actuator $L_i$. While only a single power stage configured to drive a single solenoid is depicted in FIG. 2, a circuit arrangement as described herein may include any number of power stages 21i configured to drive any number of corresponding solenoids Li as shown by the indicator "i" as applied to the various components illustrated in FIG. 2. The power stage(s) may be implemented in a separate chip package and mounted to the same PCB as the driver unit 20. Alternatively, the power stage 21i may be part of the driver unit 20 or also be integrated in the solenoid actuator L. In the present example, the solenoid (represented by the inductor L) of a solenoid fuel injector is electrically connected between a high side transistor $T_{HS1}$ and a low-side transistor $T_{LS}$, such that the load current paths of the transistors $T_{HS1}$, $T_{LS}$ and the inductor are electrically coupled in series. The high side transistor $T_{HS1}$ is coupled between a first supply terminal that is provided with a supply voltage $V_{BOOST}$ and a first end of the solenoid. The low side transistor $T_{LS}$ is coupled between a second supply terminal that is provided with a reference potential $V_{GND}$ (e.g., ground potential) and a second end of the solenoid. A sense resistor $R_S$ may additionally be connected between the second supply terminal GND and the low side transistor $T_{LS}$. The voltage drop $i_L \cdot R_S$ across this resistor $R_S$ may then be used as measurement signal representative of the solenoid current $i_L$. A series circuit including two diodes $D_{HS2}$, $D_{LS2}$ and a further high side transistor $T_{HS2}$ may be coupled between a further supply terminal, which is provided with a further supply voltage $V_B$ ($V_B < V_{BOOST}$), and the second supply terminal ($V_{GND}$), wherein one diode $D_{LS2}$ is connected between the second supply terminal GND and the other diode $D_{HS2}$, and the high side transistor $T_{HS2}$ is connected between the further supply terminal ($V_B$) and the diode $D_{HS2}$. The common circuit node of the two diodes $D_{HS2}$, $D_{LS2}$ is connected to the first end of the inductor L. A third diode $D_{LS1}$ is connected between the first supply terminal ($V_{BOOST}$) and the common circuit node of the low side transistor $T_{LS}$ and the sense resistor $R_S$.

The drive signals $S_D$ (in the present example three drive signals $S_{DH1}$, $SD_{H1}$, $S_{DL}$, collectively $S_D$, are used) that are generated and provided by the driver unit 20 are supplied to the gate electrodes of the three MOS transistors $T_{HS1}$, $T_{HS2}$ and $T_{LS}$, respectively.

FIG. 2 also illustrates two exemplary signals that may be monitored by monitoring unit 24i. In the present example, the voltage $V_S$ across the resistor $R_S$ is supplied to the driver unit 20 as feedback signal $S_{Fi}$ and the source voltage of the high side transistor $T_{HS}$ is supplied to the driver unit 20 as feedback signal $S_{F2}$. Dependent on the actual implementation and the requirements of the application, more sophisticated power stages may be used and further or different signals may be fed back to the driver unit 20.

Figure 3:
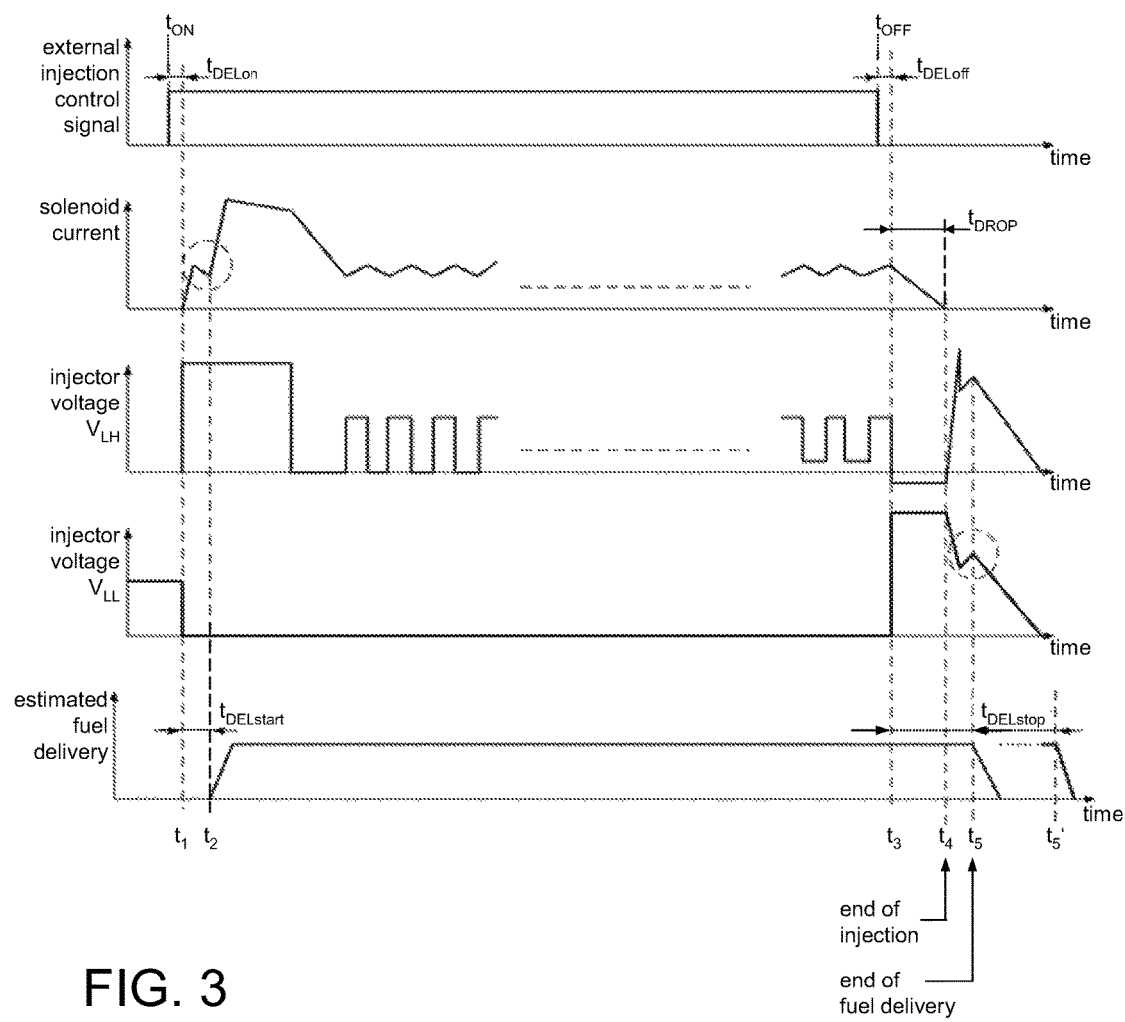
FIG. 3 is a timing diagram that depicts one or more timing relationships associated with the example power stage illustrated in FIG. 3.

FIG. 3 illustrates one example of waveforms of the signals associated with a driver unit 20 and a power stage coupled to a solenoid fuel injector. In particular, FIG. 3 includes three timing diagrams. The top diagram illustrates the time instants $t_{ON}$ and $t_{OFF}$ at which a programmable control circuit 23 (PCU) receives a trigger command (rising edge at time $t_{ON}$) to actuate the solenoid (i.e., deliver fuel through the injector) and to stop the current flow (falling edge at time $t_{OFF}$) through the solenoid (i.e., stop delivering fuel, the deactivation of the solenoid actuator), respectively. The trigger commands thus mark the rising and the falling edge of an external injection control signal. The signal is classified as "external" as it is controlled by the MCU 10, which is a device external to the driver unit 20.

The second diagram represents the corresponding solenoid current $i_L$. Accordingly, the solenoid current $i_L$ corresponds to a typical so-called "peak & hold current profile." The high current peak at the beginning of an injection cycle is needed to open the injector valve quickly whereas a lower current is then sufficient to hold the injector open. The third diagram illustrates the voltage $V_{LH}$ at the first end (high-side) of the solenoid L while the fourth diagram illustrates the voltage $V_{LL}$ at the second end (low-side) of the solenoid L. From the waveform of the voltages $V_{LL}$ and $V_{LH}$ one can see that there exist delay times $t_{DELon}$ and $t_{DELoff}$ between an "action" in the external injector control signal (i.e., the rising edge at the time $t_{ON}$ and the falling edge at time $t_{OFF}$) and a "reaction" of the solenoid visible in the solenoid current. Therefore, the solenoid current starts to rise at a time $t_1$ which is a delay time $t_{DELon}$ after the time $t_{ON}$. Similarly, the solenoid current starts to fall to zero at a time $t_3$ which is a delay time $t_{DELoff}$ after the time $t_{OFF}$. However, it takes another delay time $t_{DROP}$ until the solenoid current has finally dropped to zero at a time $t_4$ ($t_4 = t_3 + t_{DROP}$).

The fifth diagram illustrates the resulting estimates fuel delivery which starts at a time $t_2$ and stops at a time $t_5$. That is, the time instants $t_2$ and $t_5$ refer to the time at which the injector actually opens the valve and starts fuel delivery and, respectively, to the time at which the injector actually closes the valve and stops fuel delivery. The mechanical delay of valve is denoted as $t_{DELstart}$ and $t_{DELstop}$, respectively, wherein $t_2 = t_1 + t_{DELstart}$ and $t_5 = t_4 + t_{DELstop}$. The time instants $t_2$ and $t_5$ (or the delay times $t_{DELstart}$ and $t_{DELstop}$) may be determined by observing the current gradient of the solenoid current when the injector is supposed to open and the voltage gradient of injector voltage $V_{LL}$ when the injector is supposed to close, respectively. The discontinuities in the rising injector current or the falling injector voltage indicate the mechanical opening and the closing, respectively, of the injector valve.

As a result of the completely synchronous operation of the serial transfer of both trigger commands and data between MCU 10 and driver unit 20 and the operation of the PCUs 23 the delay times $t_{DELon}$ and $t_{DELoff}$ can be limited to the sub-microsecond range. The position of an intermediate peak in the rising edge of the solenoid current indicates the time instant $t_2$ at which the solenoid injector actually opens and starts delivering fuel. Similarly, the position of an intermediate peak in the falling edge of the voltage $V_L$ across the solenoid indicates the time instant $t_5$ at which the solenoid injector closes and stops delivering fuel. As mentioned above, these time instants may be signaled back to the MCU 10.

Figure 4:
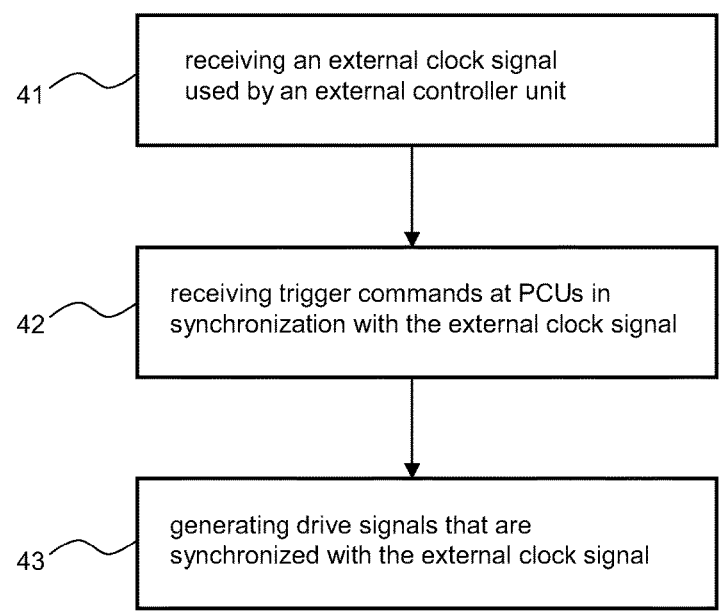
FIG. 4 is a flow chart illustrating one exemplary method for driving inductive actuators in accordance with the present disclosure.

FIG. 4 summarizes one exemplary method for driving a plurality of inductive actuators. In accordance with one embodiment the method includes receiving an external clock signal CLK used by an external controller unit, e.g., the MCU 10 illustrated in FIG. 1 (see step 41 in the flow chart of FIG. 4). The clock signal CLK is received at the driver unit 20 which may include a synchronization circuit that is configured to generate one or more internal (i.e., for internal use in the driver unit) clock signals $CLK_{INTa}$, $CLK_{INTb}$ which are synchronous to the received external clock signal CLK. Furthermore, the method includes (step 42 in the flow chart of FIG. 4) receiving trigger commands from the external control unit (e.g., the MCU 10) at a plurality of PCUs 23a, 23b in synchronization with the external clock signal CLK. Each one of the plurality of inductive actuators is associated with one of the PCUs 23a, 23b. The PCUs 23a, 23b are included in the driver circuit and may be programmed, e.g., using appropriate software. In accordance to the presently described method driver signals $S_{Da}$, $S_{Db}$ are generated by the PCUs in response to the received trigger commands, in synchronization with the external clock (step 43 in the flow chart of FIG. 4). The driver signals $S_{Da}$, $S_{Db}$ are also synchronized with the external clock signal CLK and correspond to one or more pre-programmed load current templates for the inductive actuator $L_a$, $L_b$ associated with the respective PCU 23a, 23b. Synchronization with the external clock signal CLK may be accomplished indirectly by synchronization with one of the internal clock signals $CLK_{INTa}$, $CLK_{INTb}$.

Although various exemplary embodiments have been disclosed, it will be apparent to those skilled in the art that changes and modifications can be made according to a specific implementation of the various embodiments and without departing from the spirit and scope of the invention. It will be obvious to those reasonably skilled in the art that other components performing the same functions may be suitably substituted. Particularly, signal processing functions may be performed either in the time domain or in the frequency domain while achieving substantially equal results. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the concept are intended to be covered by the appended claims.

What is claimed is:

1. A driver unit for driving a plurality of inductive actuators comprising:
   a clock terminal configured to receive an external clock signal used by an external control unit that is external to the driver unit; and
   a serial bus interface different from the clock terminal, the serial bus interface configured to communicate with the external control unit via a serial bus, wherein the serial bus interface is configured to communicate both of the following in a sequential manner over the serial bus:
      trigger commands synchronized to the external clock signal that indicate to at least one of a plurality of programmable control circuits (PCUs) to generate drive signals for the plurality of inductive actuators in response to the trigger commands that are synchronized with the external clock signal; and
      data associated with the at least one of the plurality of PCUs and synchronized with the external clock signal, wherein the data is used by the at least one of the plurality of PCUs to generate the drive signals in response to the trigger commands.

2. The driver unit of claim 1, wherein the serial bus interface receives the data associated with the at least one of the plurality of PCUs and synchronized with the external clock signal during at least one time period when the serial bus interface does not receive at least one of the trigger commands synchronized to the external clock signal.

3. The driver unit of claim 1, wherein communicating both of the trigger commands synchronized to the external clock signal and the data associated with at least one of the plurality of PCUs and synchronized with the external clock signal is based on:
   detecting one or more of the trigger commands and the data in response to detection of at least one edge associated with the external clock signal.

4. The driver unit of claim 1, wherein trigger commands and data which are communicated using the serial bus interface are received as a serial bit stream which is in phase which the external clock signal.

5. The driver unit of claim 1, further comprising:
   a synchronization circuit coupled to the clock terminal and configured to:
   receive the external clock signal; and
   generate one or more internal clock signals that are synchronized to the external clock signal;
   wherein the plurality of PCUs receive, via the serial bus interface, the trigger commands from the external control unit in synchronization with the external clock signal based on the one or more internal clock signals.

6. The driver unit of claim 5, wherein the driver unit supplies the one or more generated internal clock signals to the serial bus interface to synchronize data transmission between the external control unit and the driver unit.

7. The driver unit of claim 5, wherein the synchronization circuit includes a phase locked loop (PLL) configured to generate the one or more internal clock signals that are synchronized to the external clock signal.

8. The driver unit of claim 1, further comprising a plurality of measurement circuits that are each coupled to the serial bus interface and associated with one of the plurality of inductive actuators and configured to:
   receive at least one feedback signal from the one of the plurality of inductive actuator;
   digitize the at least one feedback signal; and
   send one or more of the at least one feedback signal and data derived from the at least one feedback signal to the external controller unit via the serial bus interface.

9. The driver unit of claim 8, wherein the measurement circuit is further configured to:
   send one or more of the at least one feedback signal and data derived from the at least one feedback signal to the external controller unit to one or more of the plurality of PCUs.

10. The driver unit of claim 1, further comprising a plurality of measurement circuits that are each coupled to the serial bus interface and associated with one of the plurality of inductive actuators and configured to:
    receive at least one feedback signal from the one of the plurality of inductive actuator;
    digitize the at least one feedback signal; and
    send one or more of the at least one feedback signal and data derived from the at least one feedback signal to the external controller unit to one or more of the plurality of PCUs.

11. The driver unit of claim 10, wherein one or more of the plurality of PCUs is programmed to adjust the drive signals dependent on the at least one feedback signal.

12. A method for driving a plurality of inductive actuators, the method comprising:
    receiving, at a clock terminal, an external clock signal used by an external controller unit;
    receiving trigger commands, via a serial bus different from the clock terminal, from the external controller unit at a plurality of programmable control circuits (PCUs) in synchronization with the external clock signal, wherein the plurality of PCUs are each associated with one of the plurality of inductive actuators;
    generating, in response to the received trigger commands and using the plurality of PCUs, drive signals for the plurality of inductive actuators that are synchronized with the external clock signal; and
    receiving, via the serial bus, data associated with at least one of the plurality of PCUs and synchronized with the external clock signal, wherein the data is used by the at least one of the plurality of PCUs to generate the drive signals in response to the trigger commands, wherein the data associated with the at least one of the plurality of PCUs and the trigger commands are received on the serial bus in a sequential manner.

13. The method of claim 12, further comprising:
    generating one or more internal clock signals synchronized with the external clock signal received from the external controller unit;
    wherein generating the drive signals that are synchronized with the external clock signal comprises using the generated one or more internal clock signals to clock one or more of the plurality of PCUs synchronously with the external clock signal.

14. The method of claim 12, wherein synchronizing data transmission to and from the external controller unit with the external clock signal comprises:
    generating one or more internal clock signals which are synchronous to the external clock signal received from the external controller unit; and using at least one of the one or more internal clock signals to synchronize receiving the trigger commands from the external controller unit.

15. The method of claim 14, further comprising using at least one of the one or more internal clock signals to synchronize the data transmission to and from the external control unit.

16. The method of claim 14, further comprising using at least one of the one or more internal clock signals to synchronize generating, using the plurality of PCUs, drive signals that are synchronized with the external clock signal and correspond to one or more pre-programmed load current templates for the inductive actuator associated with a respective PCU of the plurality of PCUs.

17. The method of claim 13, further comprising using a phase locked loop (PLL) to generate the one or more internal clock signals from the external clock signal.

18. The method of claim 12, further comprising measuring, using at least one of a plurality of measurement circuits that are each associated with one of the plurality of inductive actuators, at least one feedback signal from the inductive actuators.

19. The method of claim 18, further comprising:
digitizing, using the at least one of the plurality of measurement circuits, the at least one feedback signal; and
sending one or more of the at least one feedback signal and data derived from the at least one feedback signal to the external controller unit in synchronization with the external clock signal.

20. The method of claim 18, further comprising digitizing the at least one feedback signal and sending the at least one feedback signal or the data derived from the at least one feedback signal to a respective PCU of the plurality of PCUs, which is associated with the inductive actuator at which the feedback signal has been measured.

21. The method of claim 20, further comprising adjusting the generating, using the plurality of PCUs, of the drive signals that are synchronized with the external clock signal based on the at least one feedback signal.

22. An engine control unit including:
a micro controller unit (MCU); and
a driver unit configured to drive a plurality of inductive actuators, the driver unit comprising:
  a clock terminal configured to receive an external clock signal that is used by the MCU;
  a serial bus interface, different from the clock terminal, configured to communicate with the MCU via a serial bus; and
  a plurality of programmable control circuits (PCUs) that are each associated with one of the plurality of inductive actuators and are synchronized with the external clock signal and coupled to the serial bus interface, wherein the plurality of PCUs are each configured to:
    receive, via the serial bus interface, trigger commands from the MCU that are synchronized with the external clock signal;
    generate, in response to a trigger command of the received trigger commands, drive signals synchronized with the external clock signal that correspond to one or more pre-programmed load current templates for the inductive actuator associated with a respective PCU of the plurality of PCUs; and
    receive, via the serial bus interface, data from the MCU that is associated with at least one of the plurality of PCUs and synchronized with the external clock signal, wherein the data from the MCU associated with the at least one of the plurality of PCUs and the trigger commands are communicated in a sequential manner over the serial bus.

23. The engine control unit of claim 22, further comprising:
a printed circuit board (PCB);
wherein the MCU and the driver unit are both arranged in separate chip packages that are mounted on the PCB.

* * * * *